(12) United States Patent
Köhler et al.

(10) Patent No.: US 7,304,680 B2
(45) Date of Patent: Dec. 4, 2007

(54) METHOD AND DEVICE FOR CORRECTING AN IMAGE, PARTICULARLY FOR OCCUPANT PROTECTION

(75) Inventors: Thorsten Köhler, Deuerling (DE); Ulrich Wagner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 623 days.

(21) Appl. No.: 10/469,782

(22) PCT Filed: Oct. 3, 2002

(86) PCT No.: PCT/DE01/00825

§ 371 (c)(1),
(2), (4) Date: May 12, 2004

(87) PCT Pub. No.: WO02/078346

PCT Pub. Date: Oct. 3, 2002

(65) Prior Publication Data

US 2004/0202380 A1    Oct. 14, 2004

(51) Int. Cl.
H04N 7/18 (2006.01)
H04N 9/64 (2006.01)
G02B 13/16 (2006.01)
G02B 27/22 (2006.01)
G06K 9/40 (2006.01)
G06K 9/32 (2006.01)

(52) U.S. Cl. ............ 348/335; 348/36; 348/148; 348/716; 382/275; 382/293; 359/470

(58) Field of Classification Search .......... 348/36, 348/65, 148, 335, 231.6, 716; 382/275, 285, 382/293, 295, 298; 359/470; 353/5
See application file for complete search history.

(56) References Cited

U.S. PATENT DOCUMENTS

| | | | | | |
|---|---|---|---|---|---|
| 5,067,019 | A | * | 11/1991 | Juday et al. ............... | 348/580 |
| 5,185,667 | A | * | 2/1993 | Zimmermann .............. | 348/36 |
| 5,200,818 | A | * | 4/1993 | Neta et al. ................. | 348/36 |
| 5,345,542 | A | * | 9/1994 | Wye ......................... | 345/428 |

(Continued)

FOREIGN PATENT DOCUMENTS

EP    450 718 A1    3/1991

(Continued)

OTHER PUBLICATIONS

Shah et al.; "A Simple Calibration Procedure for Fish-Eye (High Distortion) Lens Camera"; 1994 IEEE International Conference on Robotics and Automation. Proceedings; May 8-13, 1994; IEEE; vol. 4, pp. 3422-3427.*

(Continued)

Primary Examiner—John M. Villecco
(74) Attorney, Agent, or Firm—Laurence A. Greenberg; Werner H. Stemer; Ralph E. Locher (57) ABSTRACT

A source image (S) that is distorted by camera optics is transformed into a corrected image (T) by using a tabular imaging rule. This transformation occurs directly during the reading out from the image sensor and in real-time. No, one or several target pixels in the target image (T) are assigned to each source pixel of the source image.

4 Claims, 10 Drawing Sheets

U.S. PATENT DOCUMENTS

| | | |
|---|---|---|
| 5,384,588 A | 1/1995 | Martin et al. |
| 5,508,734 A * | 4/1996 | Baker et al. .................. 348/36 |
| 5,528,194 A * | 6/1996 | Ohtani et al. ............... 382/293 |
| 5,691,765 A * | 11/1997 | Schieltz et al. ............. 348/335 |
| 5,796,426 A * | 8/1998 | Gullichsen et al. .... 348/207.99 |
| 5,815,199 A | 9/1998 | Palm et al. |
| 5,818,527 A * | 10/1998 | Yamaguchi et al. ........ 348/335 |
| RE36,207 E * | 5/1999 | Zimmermann et al. ..... 348/143 |
| 5,990,941 A * | 11/1999 | Jackson et al. ........ 348/207.99 |
| 5,999,660 A * | 12/1999 | Zorin et al. ................. 382/276 |
| 6,043,837 A * | 3/2000 | Driscoll et al. ................ 348/36 |
| 6,211,911 B1 * | 4/2001 | Komiya et al. .......... 348/218.1 |
| 6,538,691 B1 * | 3/2003 | Macy et al. ................. 382/293 |
| 6,618,081 B1 * | 9/2003 | Harada et al. ........... 348/231.6 |
| 6,704,434 B1 * | 3/2004 | Sakoh et al. ................ 382/104 |
| 6,795,113 B1 * | 9/2004 | Jackson et al. ............. 348/335 |
| 6,833,843 B2 * | 12/2004 | Mojaver et al. ............ 345/647 |
| 6,920,234 B1 * | 7/2005 | Koenig et al. .............. 382/103 |
| 6,937,282 B1 * | 8/2005 | Some et al. ................. 348/335 |
| 7,058,235 B2 * | 6/2006 | Wakamoto et al. ......... 382/275 |
| 7,202,888 B2 * | 4/2007 | Tecu et al. .................. 382/298 |
| 7,224,392 B2 * | 5/2007 | Cahill et al. .................. 348/36 |
| 2004/0169726 A1 * | 9/2004 | Moustier et al. ............ 348/335 |
| 2004/0234100 A1 * | 11/2004 | Belau et al. ................ 382/104 |
| 2005/0007478 A1 * | 1/2005 | Ahiska ........................ 348/335 |
| 2007/0025636 A1 * | 2/2007 | Furukawa et al. .......... 382/275 |
| 2007/0115384 A1 * | 5/2007 | Furukawa ................... 348/335 |

FOREIGN PATENT DOCUMENTS

| | | | |
|---|---|---|---|
| JP | 09202180 A | * | 8/1997 |
| JP | 10-271490 | | 9/1998 |
| JP | 2001145012 A | * | 5/2001 |
| WO | WO 99/12349 | | 3/1999 |

OTHER PUBLICATIONS

Claus et al.; "A Rational Function Lens Distortion Model for General Cameras"; Proceedings of the 2005 IEEE Computer Society Conference on COMputer Vision and Pattern Recognition; IEEE; 2005.*

Zhengyou Zhang, A Flexible New Technique for Camera Calibration, Dec. 2, 1998 (Updated on Dec. 14, 1998), Microsoft Research, Microsoft Corporation, One Microsoft Way, Redmond, WA 98052.

* cited by examiner

FIG.1

ORIGINAL IMAGE

FIG.2A

TARGET IMAGE

TABLE TA

| TABLE ADDRESS TBA (COUNTER_TARGET) | SOURCE PIXEL ADDRESS SP ... | TARGET PIXEL ADDRESS TP ... |
|---|---|---|
| A | SOURCE ADDRESS PIXEL S1 | TARGET ADDRESS PIXEL T1 |
| A + 1 | SOURCE ADDRESS PIXEL S2 | TARGET ADDRESS PIXEL T2 |
| A + 2 | SOURCE ADDRESS PIXEL S3 | TARGET ADDRESS PIXEL T3 |
| A + 3 | SOURCE ADDRESS PIXEL S4 | TARGET ADDRESS PIXEL T4 |
| A + 4 | SOURCE ADDRESS PIXEL S5 | TARGET ADDRESS PIXEL T5 |
| A + 5 | SOURCE ADDRESS PIXEL S6 | TARGET ADDRESS PIXEL T6 |
| A + 6 | SOURCE ADDRESS PIXEL S7 | TARGET ADDRESS PIXEL T7 |
| A + 7 | SOURCE ADDRESS PIXEL S8 | TARGET ADDRESS PIXEL T8 |
| A + 8 | SOURCE ADDRESS PIXEL S9 | TARGET ADDRESS PIXEL T9 |
| A + 9 | SOURCE ADDRESS PIXEL S10 | TARGET ADDRESS PIXEL T10 |
| A + 10 | SOURCE ADDRESS PIXEL S11 | TARGET ADDRESS PIXEL T11 |
| A + 11 | SOURCE ADDRESS PIXEL S12 | TARGET ADDRESS PIXEL T12 |
| A + 12 | SOURCE ADDRESS PIXEL S13 | TARGET ADDRESS PIXEL T13 |
| A + 13 | SOURCE ADDRESS PIXEL S14 | TARGET ADDRESS PIXEL T14 |
| A + 14 | SOURCE ADDRESS PIXEL S15 | TARGET ADDRESS PIXEL T15 |
| A + 15 | SOURCE ADDRESS PIXEL S16 | TARGET ADDRESS PIXEL T16 |
| A + 16 | SOURCE ADDRESS PIXEL S17 | TARGET ADDRESS PIXEL T17 |
| A + 17 | SOURCE ADDRESS PIXEL S18 | TARGET ADDRESS PIXEL T18 |

FIG.5A

TABLE TB

| TABLE ADDRESS TBB | SOURCE ADDRESS SPB | TARGET ADDRESS TPB |
|---|---|---|
| B | SOURCE ADDRESS 1 (S18) | REFERENCE ADDRESS 1 T18 (REF_ADDR) |
| B + 1 | 0 | TARGET ADDRESS 1.1 T18 * (TAR_ADDR) |
| B + 2 | 0 | TARGET ADDRESS 1.1 T18 ** (TAR_ADDR) |
| ... | ... | ... |
| ... | SOURCE ADDRESS 2 | REFERENCE ADDRESS 2 |
| ... | 0 | TARGET ADDRESS 2.1 |
| ... | 0 | TARGET ADDRESS 2.2 |
| ... | ... | ... |
| LAST ENTRY | HIGHEST POSSIBLE VALUE FOR A SOURCE ADDRESS | 0 (NO SIGNIFICANCE) |

METHOD AND DEVICE FOR CORRECTING AN IMAGE, PARTICULARLY FOR OCCUPANT PROTECTION

CLAIM FOR PRIORITY

This application claims priority to International Application No. PCT/DE01/00825 which was published in the German language on Oct. 3, 2002, and filed in the German language on Mar. 5, 2001, the contents of which are hereby incorporated by reference.

TECHNICAL FIELD OF THE INVENTION

The present invention relates to a method and a device for correcting an image, particularly for occupant protection systems.

BACKGROUND OF THE INVENTION

Microsoft Research Technical Report MSR-TR-98-71 "A Flexible New Technique for Camera Calibration" discloses a method of compensating for image distortions in which a mathematical computing rule is used to map a source image recorded by a camera to a target image. The computing rule calculates the corrected target image from the source image loaded into a working memory.

This method suffers from two principal drawbacks, namely that a large memory capacity is needed to store the source image and the calculation requires considerable computing capacity.

SUMMARY OF THE INVENTION

The present invention compensates for image distortions of an image caused by a camera system quickly and cost-effectively.

In one embodiment of the invention, there is a method of compensating for image distortions proposed is used in particular in image capture systems for occupant protection systems. An image distorted by the optics of a camera system provides a source image in the image sensor of the camera system, which source image is distorted in different ways depending on the quality of the optics, the focal distance of the camera system and other optical parameters. The source image is broken down into individual source pixels. Each individual source pixel is arranged in a predefined position in the source image and the gray scale value of each individual source pixel as recorded by the image sensor is stored at a predefined source pixel address in the image sensor.

The source image is mapped to a target image using a predefined imaging rule, the result being a corrected image. The target image comprises target pixels, the gray scale value of each of which is stored under a target pixel address in a target memory. One source pixel is mapped in the process to no, one or more than one target pixel. The gray scale value of the source pixel address is stored in the process under the target pixel address.

The imaging rule for correcting a source image in a target image is preferably stored in tabular form in a memory of a microcontroller. This advantageously enables rapid processing of the imaging rule. There is, furthermore, no need for temporary storage of the source image, which considerably reduces the memory capacity required.

Another embodiment of the invention provides for the source pixel to be mapped directly to at least one target pixel without temporary storage as the source image is being read from the image sensor. This method advantageously not only reduces the memory capacity required, but also corrects the source image without delay, which is essential in particular in occupant protection systems.

Mapping the source image to the target image using the predefined imaging rule produces a target image having fewer pixels than the source image. This means that there are some source pixels that are not mapped to the target image. The image sensor generally records more information than is actually necessary. This information is filtered out by the imaging rule, so the method advantageously filters and reduces the data volume. All that then has to be stored in the microcontroller that serves as the evaluation unit is the target image generated by the imaging rule. Once again this reduces the memory capacity required in the evaluation unit.

The microcontroller and/or evaluation unit furthermore includes a table, also referred to below as a rectifying table, which table in turn includes the imaging rule required for the correction method. This table include the addresses of the source pixels that are to be mapped to the target pixels, which source pixels are also referred to below as "selected source pixels" having a "selected source pixel address". The microcontroller in the evaluation unit triggers all source pixel addresses for the source pixels in the image memory sequentially. The source pixel addresses are selected using a pointer, which is incremented by means of a counter.

Each "selected source pixel address" is allocated to at least one target pixel address of a target pixel in the table. The target addresses read from the table are filled with the gray scale value of the corresponding selected source pixel address. The use of a table for the imaging rule reduces the computing capacity required for the evaluation unit. The memory capacity required is also reduced, since only a target image having a smaller number of pixels is stored in the evaluation unit. The corrected target image is, moreover, available virtually immediately once the source image has been read from the image sensor.

The image information of the source image is more closely packed in the edge regions of the source image than it is in the center of the image. The gray scale value of at least one selected source pixel in the edge region is therefore distributed to more than one target pixel or stored in the target memory. An additional table including information required for multiple assignment and in particular of the target pixel addresses allocated to one source pixel address is used in order to permit smooth and uninterrupted incrementing of the pointer for reading the rectifying table, which includes one target pixel address per selected source pixel address. The additional table is also referred to below as the reference table. This reference table is preferably arranged directly below the rectifying table in the memory.

Each cycle (reading cycle) of reading a source pixel by the incrementing counter includes cycles, referred to below as reference cycles, in which no selected source pixel or one unselected source pixel is read. Such a reference cycle accesses the reference table that includes the additional target pixel addresses for multiple assignments not included in the rectifying table. The gray scale value of the selected source pixel is in this way allocated to multiple target pixels and stored in the target memory in a number of successive reference cycles, which are often interrupted by reading cycles. Since this happens in the "pauses" or "reference cycles" and the number of target pixels is smaller than the number of source pixels despite the multiple assignment, the image correction process is complete as soon as the entire source image has been read from the image sensor by means of the incrementing counter. The correction of the source image is thus advantageously carried out in real-time. The reduced time and memory capacity required is particularly noticeable when using two image sensors to generate a stereo image.

The use of tables rather than a computing rule enables real-time processing, which also obviates the need for temporary storage of the source image. This reduces the need for expensive working memory, as the source images are so large that they require particularly high memory capacity.

The method is preferably realized in an FBGA or ASIC. An implementation in a microprocessor is also conceivable in a further embodiment.

A definition of terms is provided for the description of the figures that follows.

The source image is the raw image supplied directly from the camera. The level and nature of the distortion affecting this image depend on the optics used.

The source pixel is a picture element in the source image.

The source pixel address is an address of a specific picture element in the source image. The picture elements are numbered linearly. It is perfectly straightforward to convert between image coordinates and source pixel address. The range of values for the source pixel address space is from zero to (number of picture elements in the source image) minus one.

The target image is the image after rectifying or correction. This image is the corrected image, in which the pixel format or pixel address space is smaller than the format of the source image or source image address space. The target pixel is one picture element in the target image.

The target pixel address is the address of a specific picture element in the target image. The picture elements are numbered linearly. It is perfectly straightforward to convert between image coordinates and target pixel address. The range of values for the target pixel address space is from zero to (number of picture elements in the target image) −1.

The rectifying table is the table in which the corresponding target pixel address is indicated for the source pixel address. The number of entries is equal to the number of target addresses. The number of target addresses is somewhat larger than the number of source pixel addresses in the case of multiple assignments. Rectification is carried out by working through this table.

The reference table is a table that stores the target pixel addresses that are called up by multiple assignment of a source pixel address to more than one target pixel address. The content of the reference table includes a reference address and a target address as target pixel address.

BRIEF DESCRIPTION OF THE DRAWINGS

The invention is explained with reference to the drawings.

Figure elements having the same functional features have the same reference identifier in the figures that follow.

DETAILED DESCRIPTION OF THE INVENTION

Figure 1:
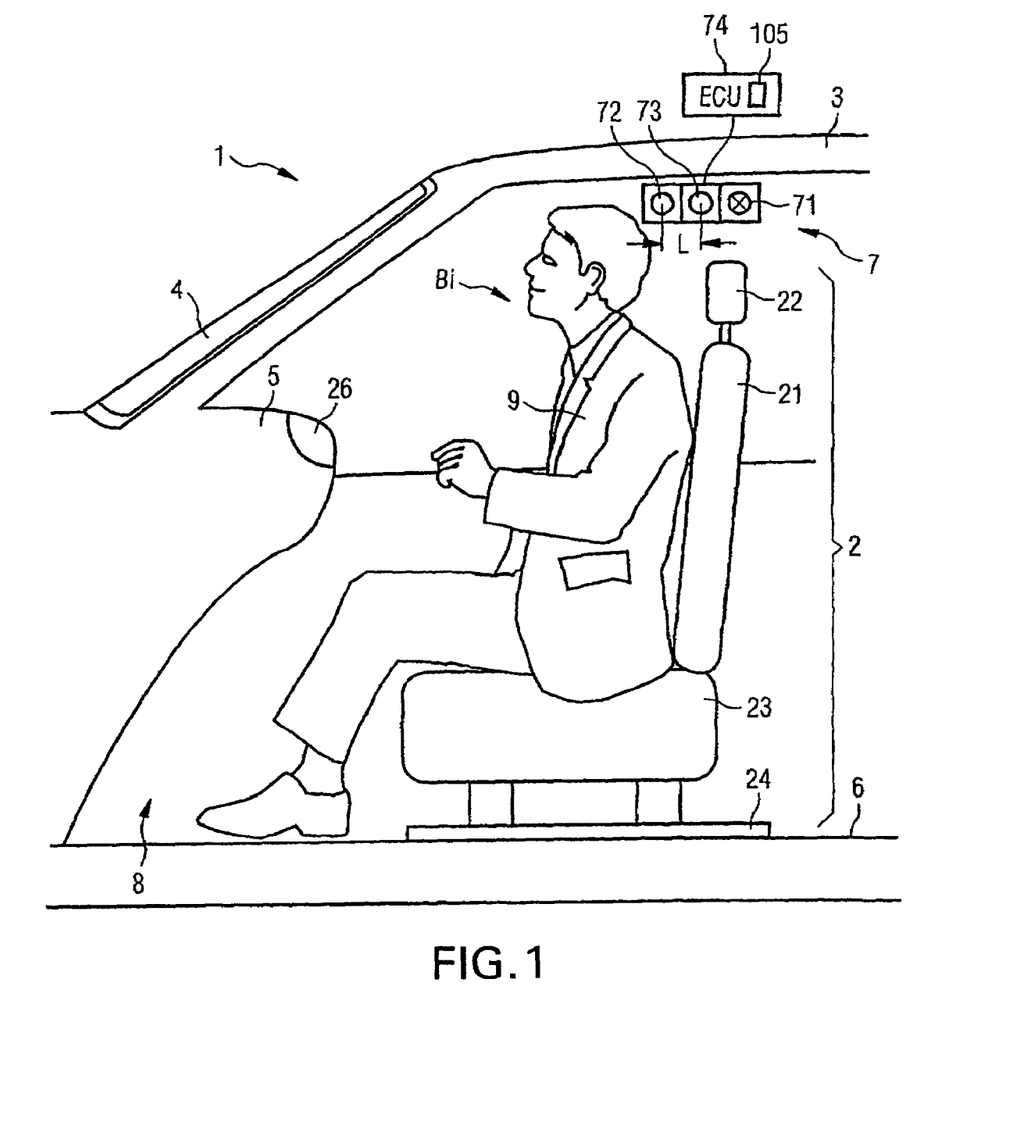
FIG. 1 shows the interior of a vehicle having an optical image capture system.

FIG. 1 shows a schematic representation of a vehicle 1 containing a vehicle seat 2 having a seat cushion 23, a seat backrest 21 and, located thereon, a headrest 22. Arranged on the inside roof lining of the vehicle roof, preferably between the two vehicle seats, is an optical camera system 7, 71, 72, 73, 74 with which a predefined image area Bi of the vehicle interior can be captured. It is preferable for two image sensors 72, 73 to capture the image area, with the vehicle seat 2 and an object 9 that may optionally be located thereon, through a camera optical system. The object 9 in FIG. 1 is shown as a schematic representation of a vehicle occupant.

The objects 9 may in further embodiments be child seats, vehicle occupants, articles, etc. or the vehicle seat 2 may be empty.

Arranged in the front part of the vehicle 1 below the wind-screen 4 is a dashboard 5 under which is located a foot well 8, which provides space for the feet and legs of the occupant 9 and includes an airbag 26. The foot well 8 is bounded at the bottom by the vehicle floor 6, on which seat position adjustment rails 24 are arranged. Brackets connect the vehicle seat 2 to the seat position adjustment rails 24 in the area beneath the seat cushion 23. The vehicle seat 2 is thus arranged such that it can be adjusted in the X direction, that is to say the direction of travel.

The camera system 7 preferably contains two image sensors 72, 73, a light source 71, which light source is preferably fitted with a number of light-emitting diodes, and an evaluation unit 74. The optical axes of the two image sensors 72, 73 have a predefined separation L. This makes it possible using stereo image processing methods to capture range information concerning the objects in the predefined image area Bi from the images recorded by the two image sensors 72, 73. The camera 7 preferably contains the two image sensors 72, 73 and the light source 71 in a compact housing. The evaluation unit 74 is preferably arranged remote from the compact housing and connected thereto by a data link in order to keep the camera system 7, which is considered to be an inconvenience by the designers of vehicle interiors, as small as possible. It is, however, entirely possible to integrate the evaluation unit 74 (ECU) into the camera housing of the camera 7. The evaluation unit 74 has a target memory 105 in which the corrected target image can be stored.

A further embodiment provides for there to be just one image sensor 71 or 73, which reduces costs. The required range information is preferably determined in this configuration by means of light propagation time measurement or some other image processing method.

Figure 2A:
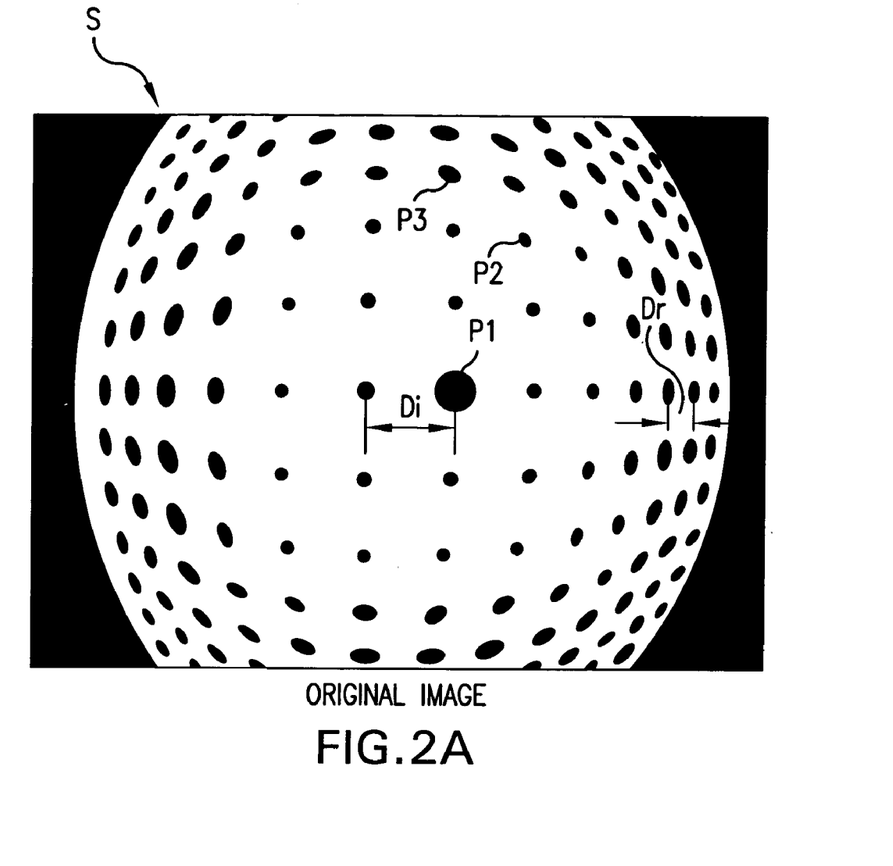
FIG. 2a shows a source image distorted by an optical system.
Figure 2B:
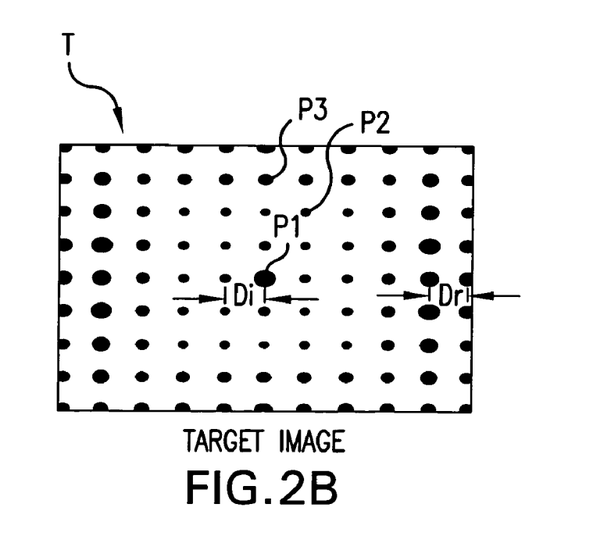
FIG. 2b shows the source image from FIG. 2a corrected using an imaging rule.

FIG. 2a shows a source image S (original image) distorted by the optical system having points P1, P2, P3 of different sizes. The source image S is the image recorded by one of the image sensors 72, 73 in FIG. 1 via a distorting camera optical system. The picture elements P1, P2, P3, which were originally arranged in the form of a matrix, have been distorted by the wide-angle characteristic of the camera optical system (fisheye effect). FIG. 2b shows a target image T that emerges after correction of the source image S. The picture elements P1, P2, P3 from the original distorted source image S can be seen in the target image arranged in an orthogonal matrix.

A comparison of the source image S from FIG. 2a and the target image from 2b clearly shows that the source image S FIG. 2a contains redundant image information at the edge of the recording area of the image sensor 72, for example the black areas along the left and right edges of the image. This redundant information is removed by the correction method and the conversion into the target image T. It can also be seen, moreover, that the distance Dr between two adjacent picture elements at the edge of the source image S appears to be smaller than the distance Di between two adjacent picture elements at the center of the source image S. The correction method also compensates for this distortion, as can be seen from the equal distances Di, Dr between the two sets of adjacent picture elements in the target image T.

Figure 3:
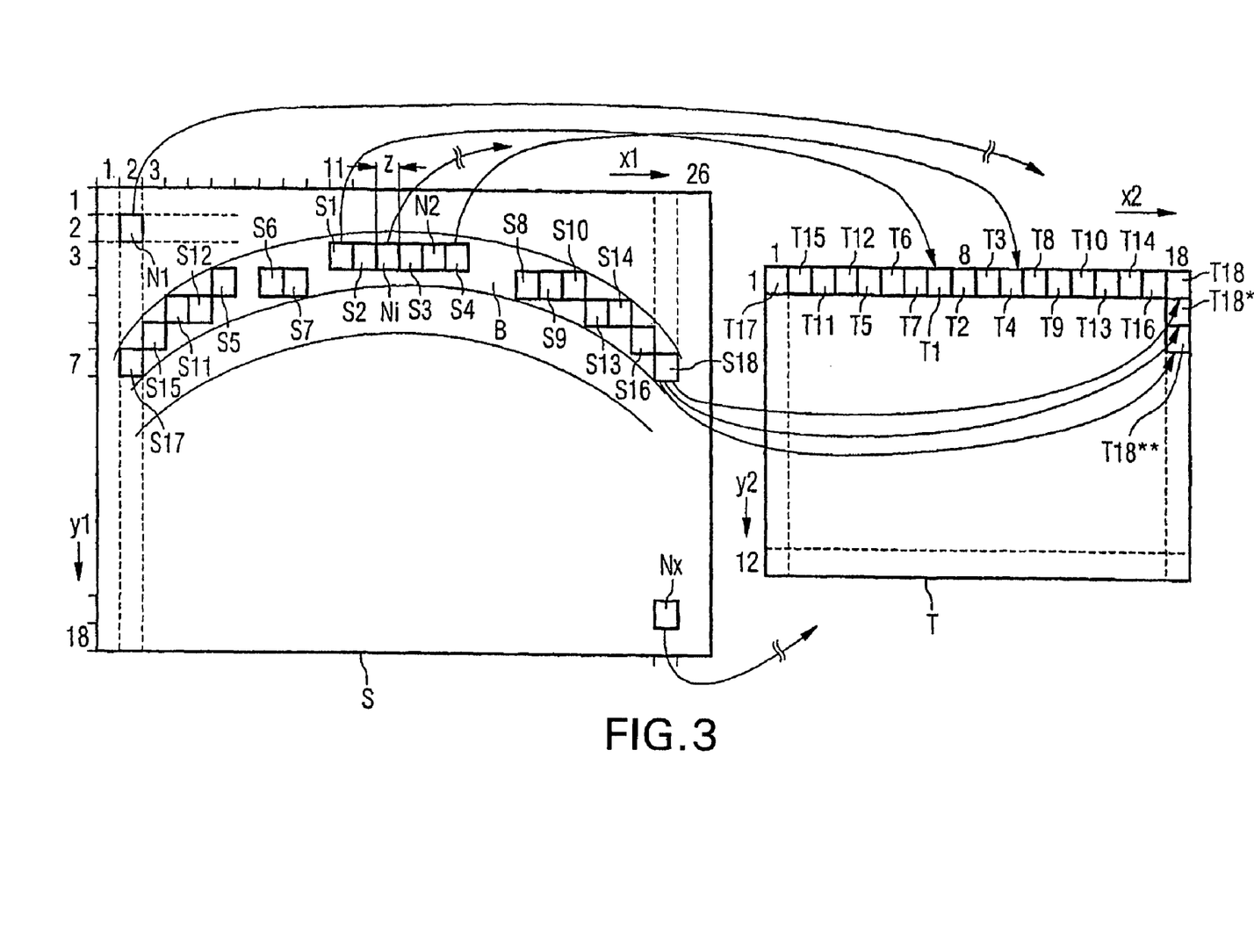
FIG. 3 shows an imaging rule that converts a source image into a corrected target image.

FIG. 3 shows a schematic representation of the imaging rule for converting a source image S into a corrected target image T. The source image S distorted by an image sensor 72, 73 (FIG. 1) via a camera optical system is broken down into source pixels N1, S1 to S18, NI, NX in the form of a matrix. The source image has twenty six (26) columns in the X1 direction (horizontal) and eighteen (18) rows in the Y1 direction (vertical). This combination spans a source pixel address space (X1,Y1). Certain predefined source pixels S1 to S18, each of which is arranged under a predefined source pixel address (X1,Y1), are selected from the source pixels of the source image S. A corresponding gray scale value recorded by the image sensor, the value of which gray scale value depends on the brightness of the corresponding source pixel, is stored under each source pixel address.

The target image T has a target pixel address space (X2,Y2) comprising 18 columns (X2) and 12 rows (Y2).

Using a correction method explained in greater detail below, the source pixel S1 having the address X1=11, Y1=3, for example, is thus mapped using an imaging rule to the address space of the target image T at target pixel address X2=8, Y2=1. The gray scale value of the source pixel S1 is stored under the target pixel address of the target pixel T1.

The allocation of the selected source pixel S1 to the target pixel T1 is unambiguous.

A second source pixel N1, which is located at the address X1=2, Y1=2 (2;2) at the edge of the image, is not captured by the imaging rule, which means that the source pixel N1 is not mapped to a target pixel of the target image T. The source pixel N1 lies outside the camera system image area Bi that is of interest for further image processing. This can be seen in FIG. 2a at the upper left edge of the image, where the source pixel N1 is located within a black field. The image sensor 72, 73 sees no usable image at this source pixel address (2;2), as the distortion of the camera optical system drags the image information toward the center of the image and the black edge of the source image S includes no image information.

Row 1 of the target image T represents the corrected image row produced from the curvilinear image row B in the source image S.

The source image S includes selected source pixels S1 to S18 and unselected source pixels N1, Ni. The selected source pixels S1 to S18 are mapped to the target pixel address space of the target image T. The unselected source pixels NI are not mapped to the target image. There are four source pixels S2, Ni, S3, N2 located between the source pixels S1 and S4 in the source image S but two target pixels T2, T3 between the corresponding target pixels T1 and T4. The target image T is thus compressed by two pixels in the horizontal (X) direction as compared with the source image S.

Located at the edge of the source image S at address X1=25, Y1=7, also referred to as address (25;7), is the source pixel S18. The distortion in the source image S means that the relevant points shown at its edges are very much compressed, as is evident from the different distances Di and Dr in FIG. 2, so the imaging rule decompresses, corrects and/or stretches the image by mapping the source pixel S18 to two target pixels T18, T18* located one above the other. The target pixel T18 is located at address (18;1) and the target pixel T18* is located at address (18;2).

The imaging rule turns the source image S having a pixel address space (X1;Y1) into a target image T having a smaller pixel address space (X2;Y2). Redundant information is filtered out of the source image S and this reduction in data volume means that less memory capacity is needed to store the target image T. The source pixel Nx (25;17), for example, is an unselected source pixel that is not contained in the imaging rule and is therefore not stored in the target memory 105 (see FIG. 1) for the target image T as "memory-consuming ballast".

Figure 4:
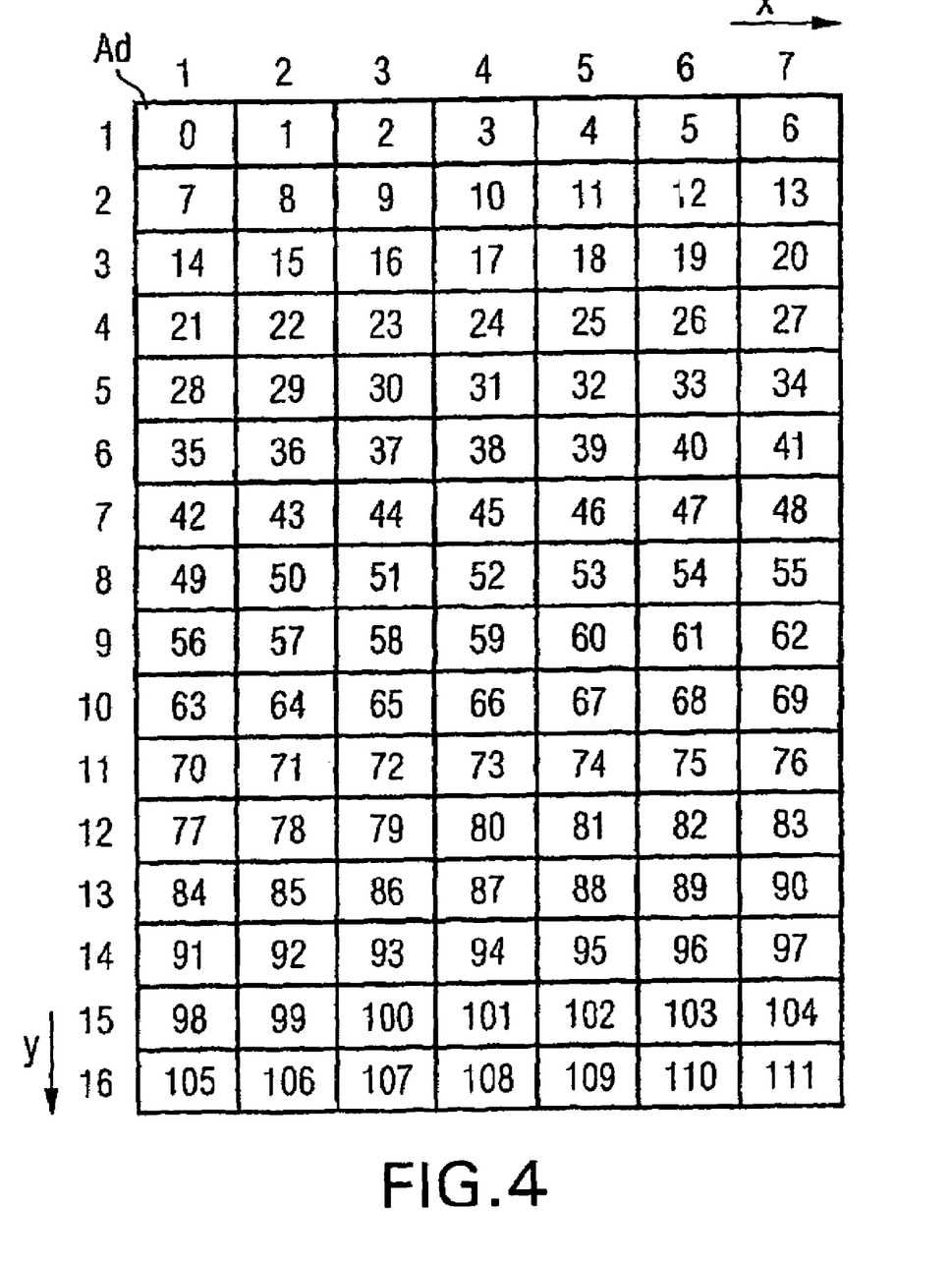
FIG. 4 shows the pixel address space of an image with the coordinates of the pixel address arranged in the form of a matrix.

FIG. 4 shows a 7×16 pixel sample image to illustrate the management of the image pixels of the source image S and target image T and also the concept of a "pixel address space". Starting from address Ad=0 in the top left corner at XY coordinates (1;1), the address Ad is incremented from left to right as far as address Ad=6 at coordinates (1;6). The next address Ad=7 is located back at the left end of the next row, which is row 2, at coordinates (2;1). The address Ad is incremented row-by-row in this manner up to the highest address Ad=111 at coordinates (7;16). This address allocation is used to read the gray scale values of an image sensor 72, 73 (FIG. 1). The address Ad is incremented continuously by means of a counter and the corresponding gray scale value for each address Ad is read from the image sensor 72, 73. The content of the image sensor 72, 73 is thus read row-by-row. The counter content including the address Ad is also referred to below as the Counter_Source.

Figure 5A:
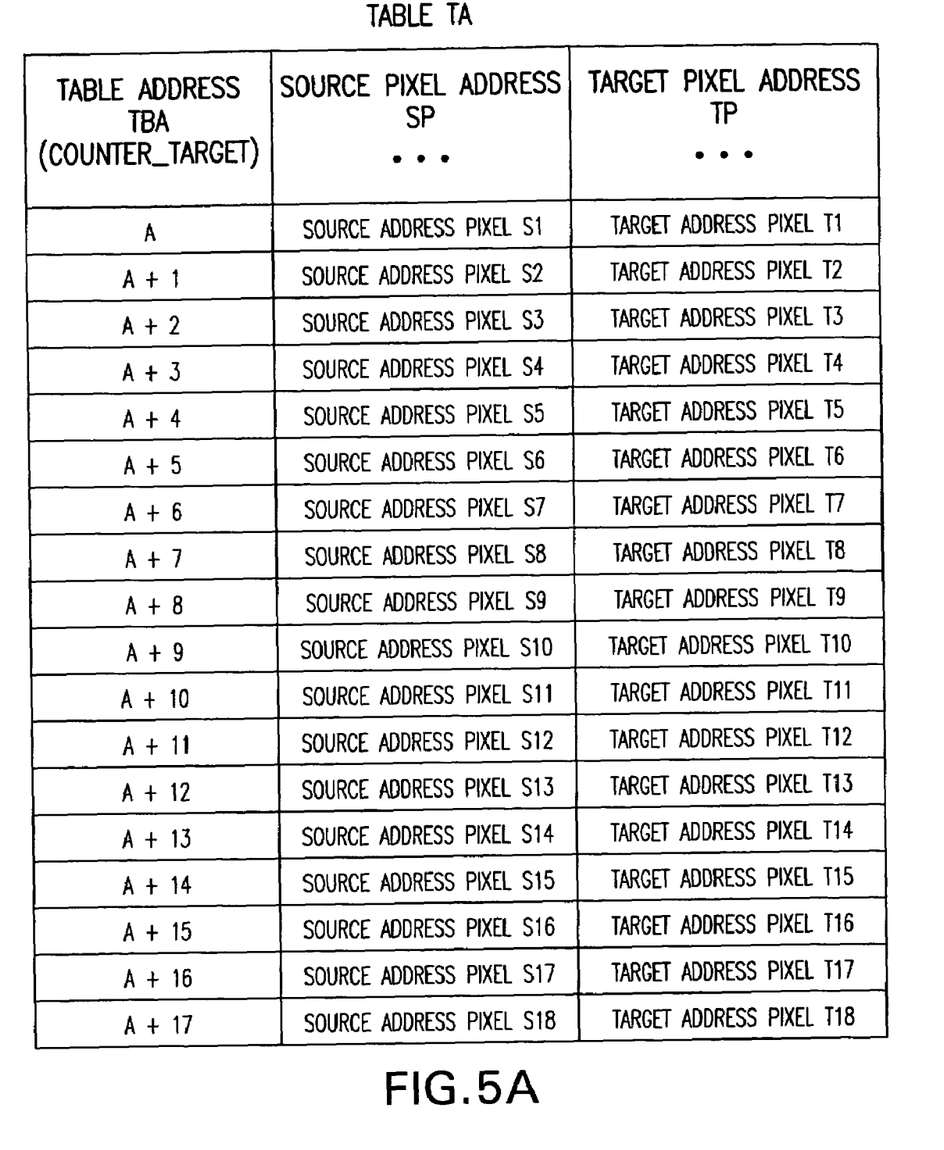
FIG. 5a shows an imaging table (rectifying table) for allocating source pixel addresses to target pixel addresses.

The imaging rule for correcting the source image S is processed with the aid of the table TA from FIG. 5a. The table TA, also referred to below as the rectifying table TA, has three columns including the table address TBA, the source pixel address SP and the target pixel address TP respectively. The table TA is sorted with the source pixel addresses in ascending order. No source pixel address is repeated.

The table address TBA includes pointer addresses A, A+1, . . . , A+17 of a pointer that indicates the respective source pixel address SP of the source pixels S1 to S18 in the second column and the respective target pixel address TP of the target pixels T1 to T18 in the third column. A cyclically incrementing counter having the counter content "Counter_Target" counts up through the table addresses TBA as is described in the figures that follow. The rectifying table TA outputs the source pixel address SP and associated target pixel address TP corresponding to the current pointer address. The rectifying table TA thus assigns each "selected" or "predefined" source pixel address SP to precisely one target pixel address TP.

One source pixel address SP is, however, allocated to more than one target pixel address TP in the case of the multiple assignments described previously. These multiple assignments or multiple mappings are made using an additional table TB shown in FIG. 5b and also referred to below as the reference table TB. The reference table TB assigns one source pixel address to multiple target pixel addresses; source pixel S18, for example, is assigned to both of target pixels T18* and T18**.

Figure 5B:
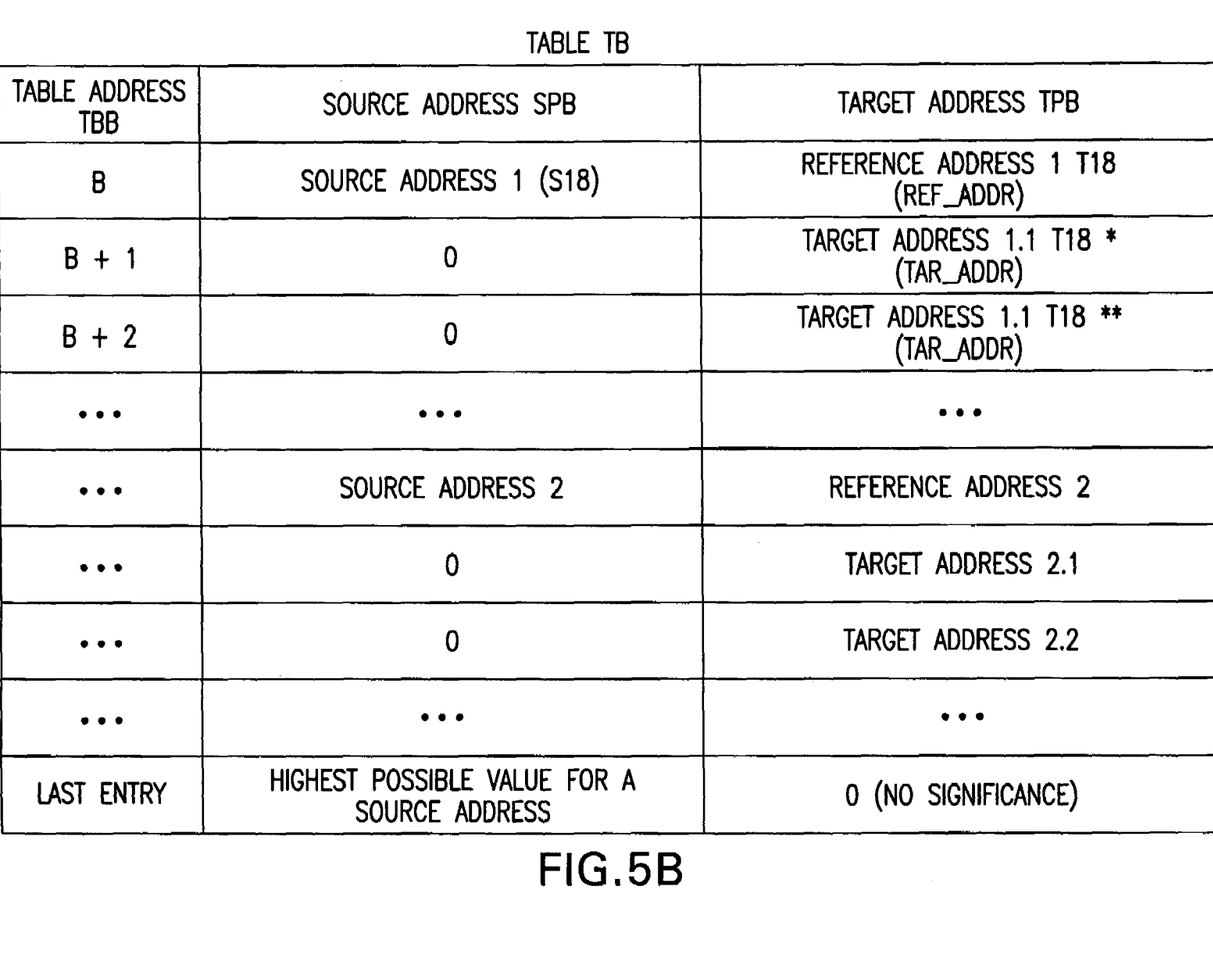
FIG. 5b shows an additional table (reference table) for allocating a source pixel address to more than one target pixel address.

The reference table TB has three columns headed "Table address TBB", "Source address SPB" and "Target address TPB". The first column includes table addresses TBB that refer to corresponding source addresses SPB in the second column and associated target addresses TPB in the third column.

A reference address in the column TPB, for example the reference address 1 of the target pixel T18, identifies a target pixel address that also occurs in the rectifying table TA. A reference address is a source address, for example the source address 1 of the column SPB, that likewise occurs in the rectifying table TA. A target address in the column TPB, for example the target addresses 1.1 and 1.2 of target pixels T18* and T18**, identifies a target pixel address that is formed by multiple assignments of one source pixel address to multiple target pixel addresses and does not occur in the rectifying table. A target address of this nature is assigned the source address "0" in the column SPB. The reference address is thus distinguished from the target address in the method described in greater detail below by means of the source address SPB value assigned in each case.

The pointer B is, for example, allocated a source address 1 and a reference address 1. This source address 1 indicates further target addresses 1.1, 1.2, which are contained in the following rows B+1, B+2, in addition to the reference address 1 also included in the table TA. The table TB is thus used for the assignment of a source address to more than one target address as explained in greater detail below.

Figure 6:
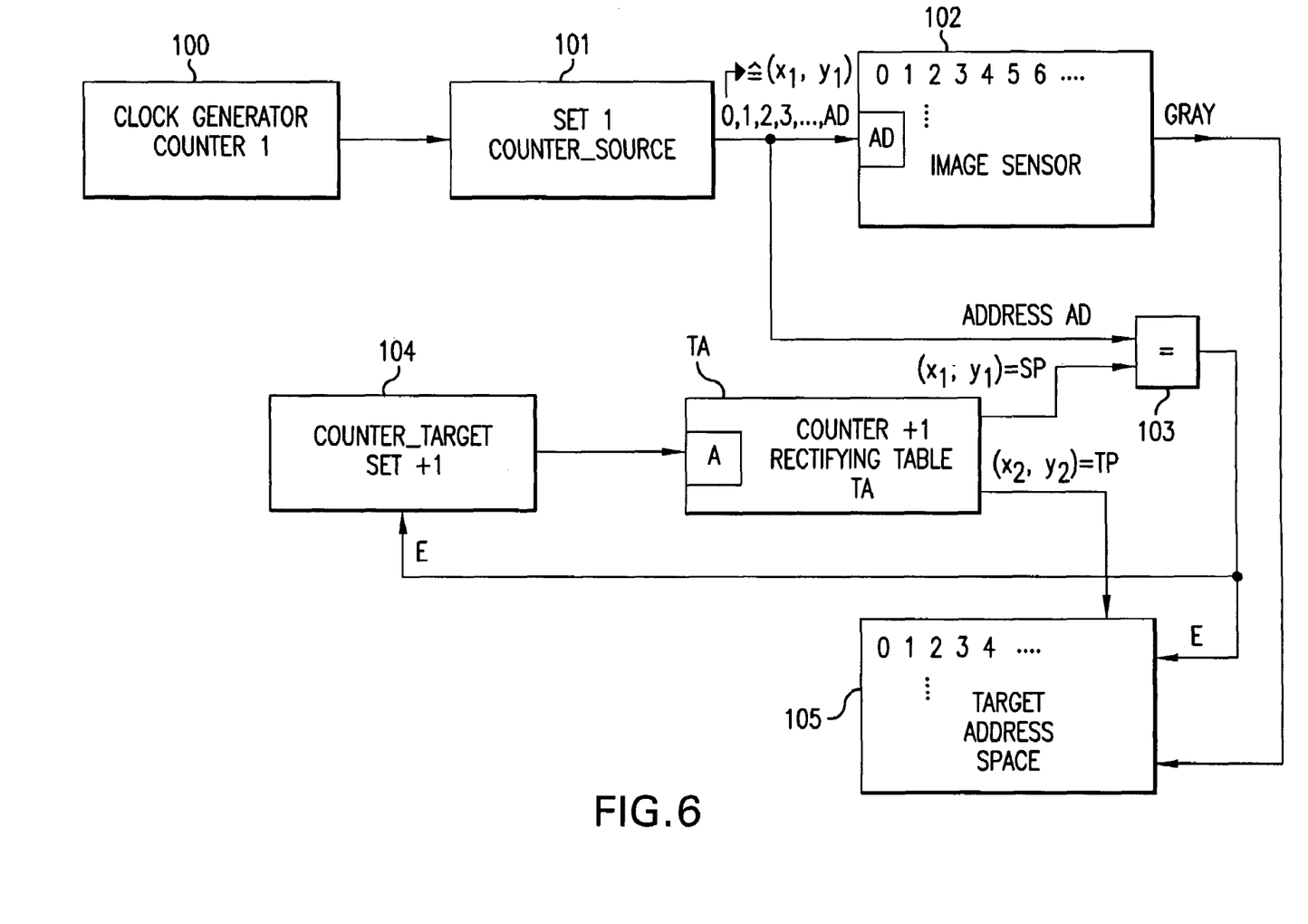
FIG. 6 shows a functional circuit diagram with which to implement the method for correcting an image recorded by an image sensor.

FIG. 6 shows the method for correcting a source image S using a tabular imaging rule TA with reference to a functional circuit diagram. The function blocks may take the form of software, hardware or a combination of software and hardware. FIG. 6 shows an imaging rule for correcting an image in which, for the sake of clarity, one-to-one assignments are made. This means that each selected source pixel S from the reference table TA is allocated to precisely one target pixel T.

A clock generator 100 sequentially increments a counter 101 having the counter content "Counter_Source". The output of the counter 101 is connected to the address input Ad of an image sensor 72, 73 having a source pixel address space 102 arranged in the form of a matrix. The counter content "Counter_Source" corresponds to the address Ad from FIG. 4. The gray scale value GREY of the selected address Ad of the image sensor 72, 73 is output at the output of the image sensor 72, 73.

The rectifying table TA shown in FIG. 6 is already known from FIG. 5a and is supplied by an additional counter 104 having the counter content "Counter_Target". The additional counter 104 indicates the pointer A of the table address TBA. The source pixel address SP (X1;Y1) of the source pixel concerned and the target pixel address TP (X2;Y2) of the target pixel concerned are present in each case at the output of the table. A comparator 103 compares the address Ad present at the image sensor 72, 73 at a given moment with the source image address SP (X1;Y1). If the instantaneous address Ad of the image sensor 72, 73 matches to the source pixel address SP1 of the rectifying table TA, an enable signal is sent to the target memory 105 that includes the target image address space. When the target memory 105 is enabled, it receives the gray scale value GREY of the source pixel concerned, which gray scale value is present in the image sensor under the instantaneous address Ad, and stores it under the target pixel address TP1 that it obtains from the rectifying table TA. The enable signal E continues to increment the counter content "Counter_Target" of the counter 104 for the next read operation so that the next selected source pixel address SP for comparison with the next instantaneous address Ad is available at the input of the comparator 103.

Using the functional circuit diagram shown in FIG. 6 and the imaging rule TA stored in the rectifying table TA, for example, the gray scale value GREY of a source pixel Si, which is stored under the address Ad (X1, Y1), is thus stored under the target image address TP1 (X2, Y2) in the target memory 105. The counter 101 is incremented so that the entire source image address space 102 of the image sensor 72, 73 is read and the corresponding selected source pixels Si are mapped in the target image address space of the target memory 105. The gray scale value GREY of the selected source pixel is stored in the process under the mapped target address TP1.

Figure 7A:
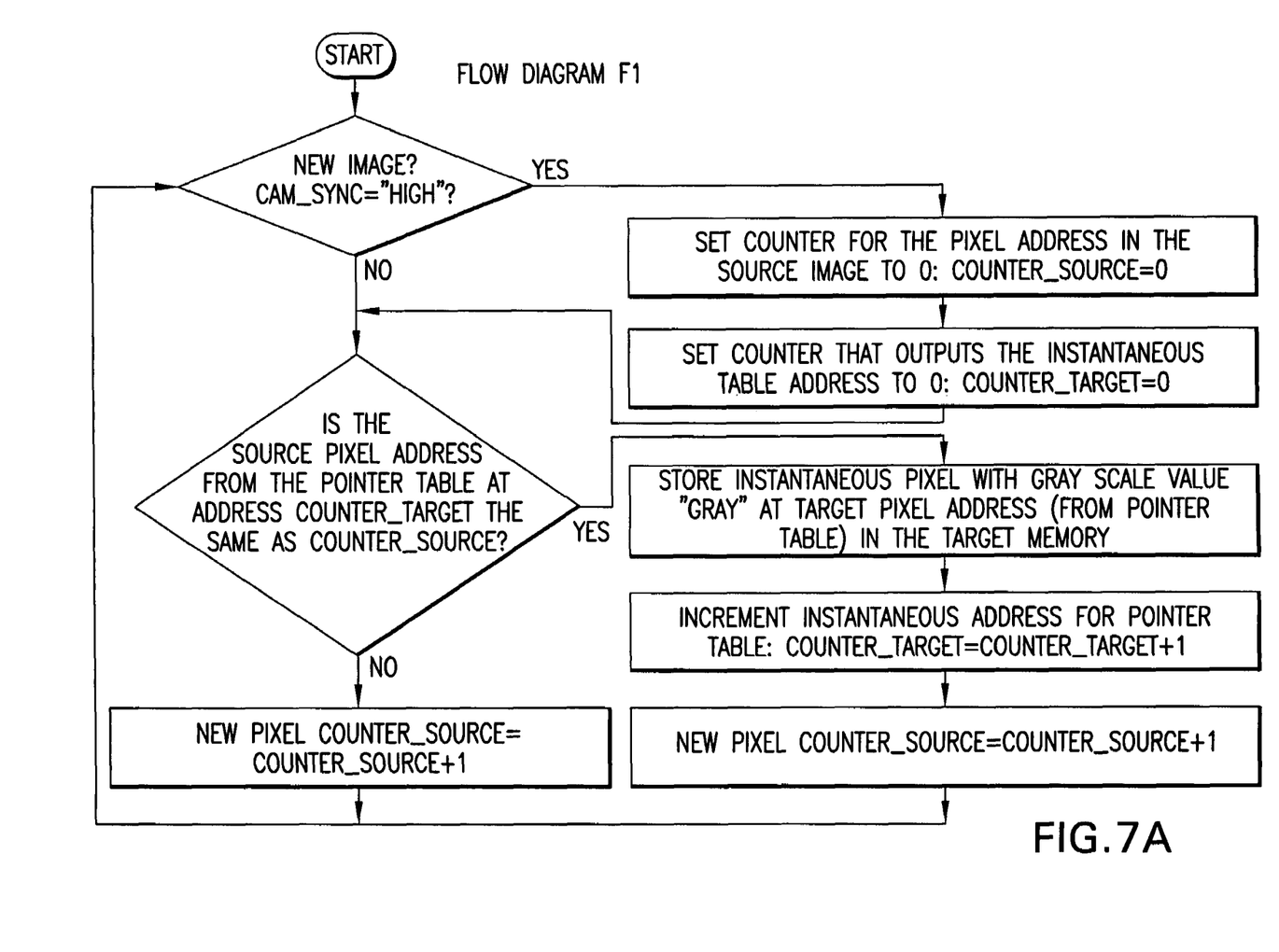
FIG. 7a shows a flow diagram of a method for correcting a source image.
Figure 7B:
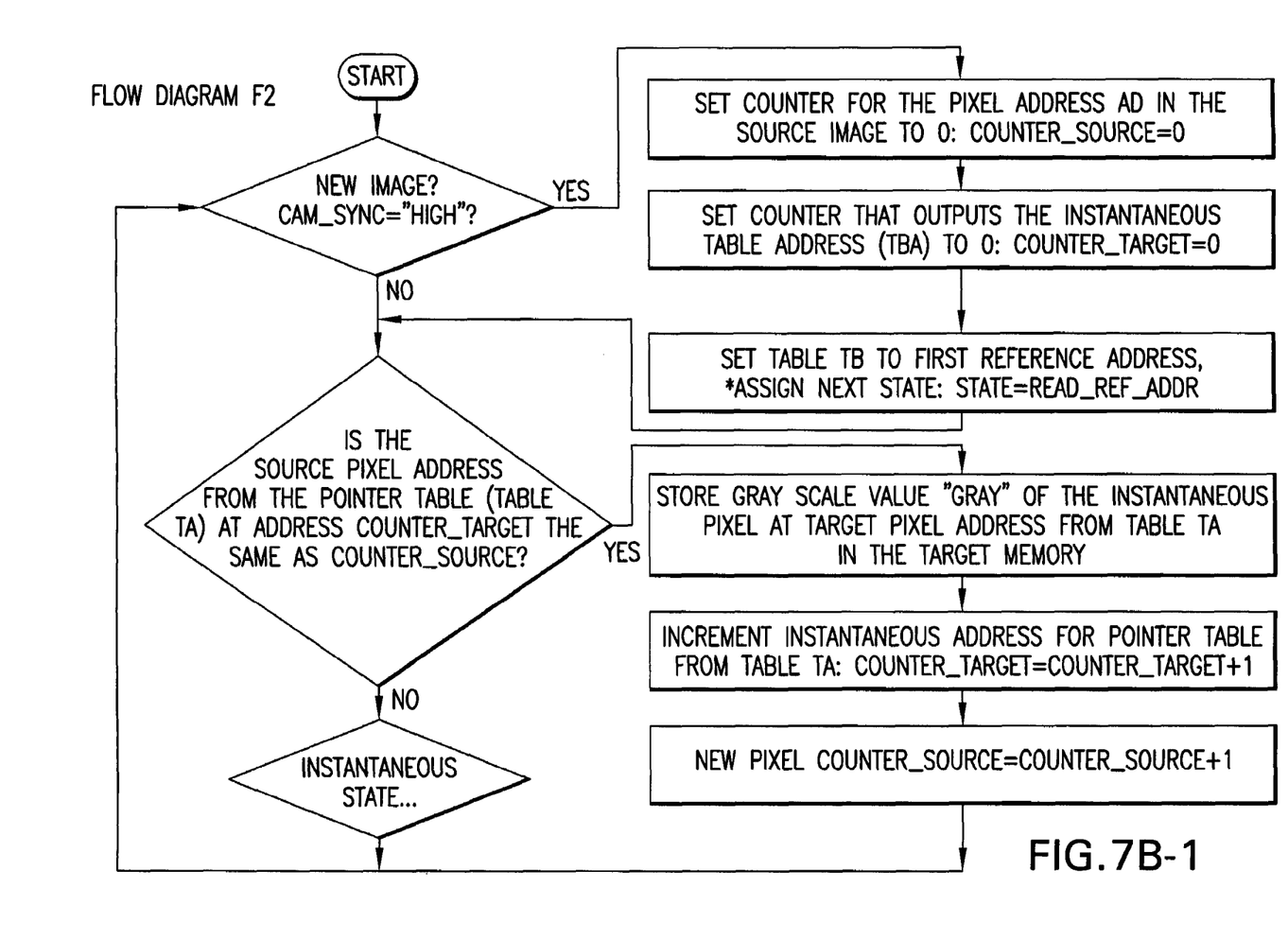
FIG. 7b shows an additional flow diagram for correcting a source image.
Figure 7B:
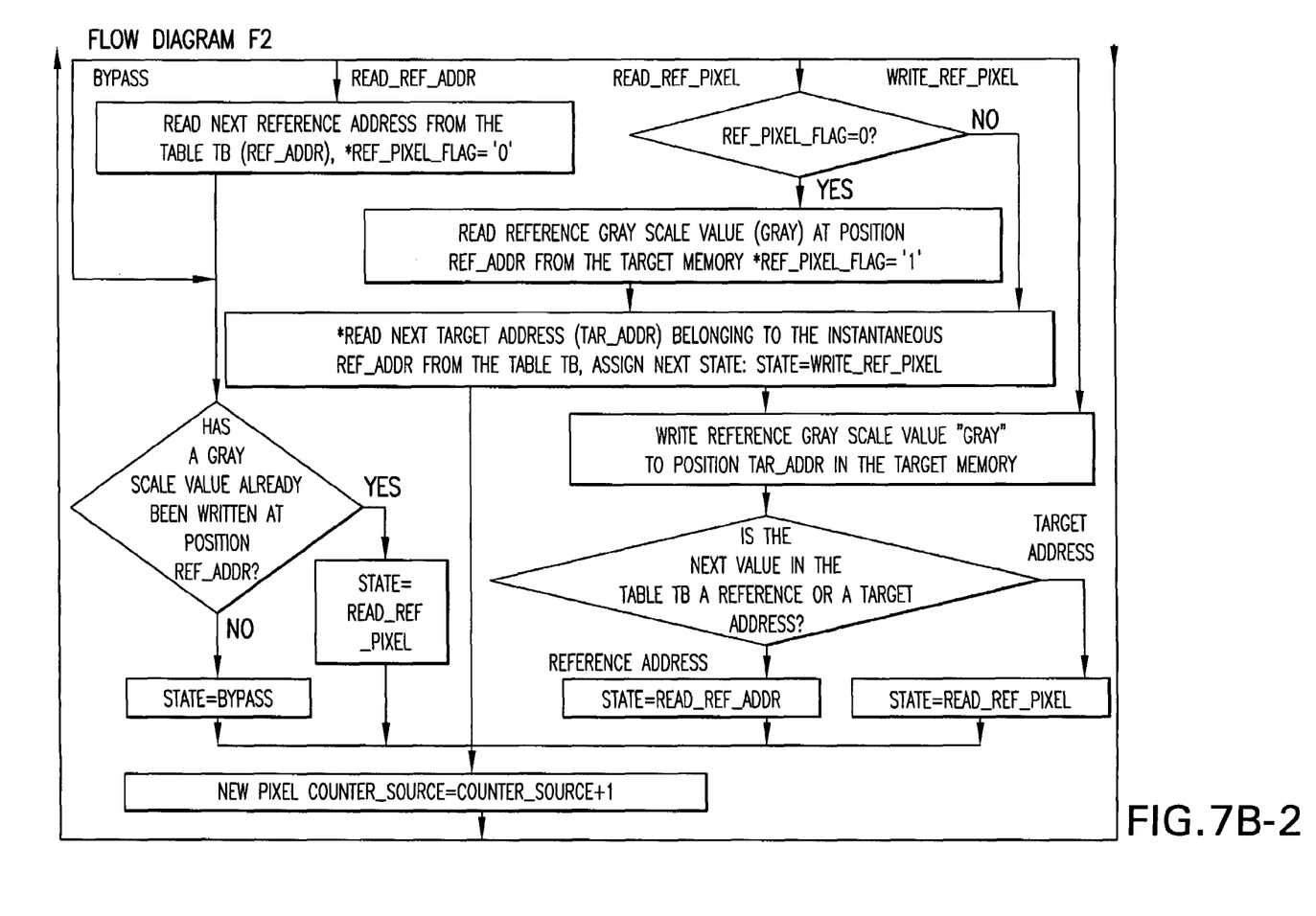

FIG. 7A shows a flow diagram F1 in which the method for correcting a source image S is explained.

A check is made when the method starts to determine whether a new source image S is to be read from the image memory 105 of the image sensor 72, 73 (CAM_SYNC=high?). If a new image is read, the counters 101 and 104 already known from FIG. 6 are set to 0 (Counter_Source=0; Counter_Target=0). This sets the address Ad in the image sensor 72, 73 to zero, which means that the reading of the source image S starts at the top left of the source image address space 102. Having been reset, the counter 104 (Counter_Target) indicates the table address A, which is the first address pixel pair SP, TP of pixels S1, T1 present in the rectifying table TA. The comparator 103 checks in the next step to determine whether the instantaneous address Ad (Counter_Source) matches the source pixel address (Counter_Target) present in rectifying table TA. If the result of this check is negative, the instantaneous address Ad of the image sensor 72, 73 is assigned no mapping instruction from the source pixel address to the target pixel address. The target memory 105 is therefore not activated by means of the enable signal and the counter 104 (Counter_Target) is not incremented. Counter 101 having the counter content "Counter_Source" is incremented, however, in order that the next source pixel in the image memory can be read.

If the instantaneous address Ad matches the source pixel address SP in the rectifying table TA, the current gray scale value GREY of the source pixel, for example S, recorded under the image address AD is stored in the target memory 105 under the target pixel address TP. The target pixel address TP required for this purpose is made available from the rectifying table TA. The enable signal of the comparator 103 and the clock generator 100 ensure that the method, which is preferably realized in a microcontroller, an ASIC and/or an FPGA, is time-synchronized. Once the gray scale value S1 has been stored in the target memory 105, the counter 104 (Counter_Target) is incremented by one (A:=A+1). This directs the rectifying table pointer A to the next selected source address SP with its associated target address TP. The counter 101 (Counter_Source) is also incremented so that the gray scale value of the next source pixel S in the image sensor 72, 73 can be read. The read cycle for a new source image begins once a check has been made to confirm that the last address in the address space of the image sensor has been reached. The imaging rule for correcting a source image S by mapping individual source pixels Si to target pixels Ti shown by way of example in FIG. 3 is thus implemented using the method according to FIG. 7a for the entire source image S.

FIG. 7b shows an additional flow diagram F2 that, in contrast to the flow diagram F1 from FIG. 7a, is also able to undertake the assignment of one source pixel address SP of one source pixel to more than one target pixel address TP. This is done using both the rectifying table TA from FIG. 5a and an additional reference table TB from FIG. 5b that includes the multiple assignments. The reference table TA preferably follows immediately after the rectifying table TB in the read-only storage of the evaluation unit 74.

The method shown in the flow diagram F2 begins after startup and the associated initialization routines. A query is made as to whether a new source image is starting (CAM_SYNC="high"?). If it is time to start reading a new source image S from the image memory of the image sensor 72, 73, the counter (Counter_Source) for the source pixel address in the source image is set to zero. The counter (Counter_Target) that indicates the table address TBA in the reference table TA is set to zero. The pointer B in the table address TBB of the table TB is set to the first source address or reference address. The first reference address here is the target pixel address to which the first source pixel address with multiple assignment is allocated, which equates in FIG. 5b to the source address 1. A state machine is, moreover, assigned a status or state "Read_Ref_Addr" intended to lead to the subsequent reading of the next value B:+B+1 in the reference table TB.

The source pixel address "Counter_Target" set by the counter 104 and output by the table TA is compared in the next step with the instantaneous source pixel address "Counter_Source" set by the other counter 101. If these two addresses are identical ("Counter_Source equals Counter_Target"), the gray scale value GREY of the currently selected source pixel is stored under the target pixel address in the target memory. This target pixel address corresponds to the reference address from the reference table TB in the case of multiple assignments.

The instantaneous address for the rectifying table TA (table address A) is incremented by one unit. The address Ad of the source pixel address of the image sensor is incremented by one unit (Counter_Source), which triggers a new source pixel in the image sensor. Following this the cycle begins again with the check to determine whether a new image is present ("CAM_SYNC=" high"?).

If the preceding comparison ("Counter_Source equals Counter_Target") finds that the source pixel address from the rectifying table TA does not match the instantaneous address Ad of the source pixel, the next step checks the state of the state machine.

The method steps that follow the state assignment use the table TB to check whether the current instance is a case of multiple assignment of one source pixel address to more than one target pixel address. If the answer is affirmative, the gray scale value GREY of the target pixel address concerned, which is also referred to below as the reference address "Ref_Addr", is read in the following read cycles and copied to the relevant additional target addresses 1.1, 1.2 (see FIG. 5b). This copying operation requires a total of three no-read cycles, that is to say three runs through the steps that follow the state query. The copying operation is thus broken down into three part steps. These part steps are completed in the time segments during which the instantaneous source pixel address indicates an unselected additional source pixel Nx, N1 (see FIG. 3). This period begins following the Counter_Target=Counter_Source comparison with the state query.

There are a total of four branches when checking the state: "Bypass", "Read_Ref_Addr", "Read_Ref_Pixel" and "Write_Ref_Pixel".

The instantaneous value of the state at the start of a new image was set to "Read_Ref_Addr". This means that the state query selects the "Read_Ref_Addr" branch, which provides for the next reference address to be read from table TB in a first step if the instantaneous source pixel address is larger than the source pixel address of the reference pixel read from the reference table TB.

Once the next reference address Ref_Addr has been read from the table TB, the "Ref_Pixel_Flag" is reset. The "Ref_Pixel_Flag" indicates, in its reset state, that the gray scale value GREY may be read from the target memory at the position of the reference address "Ref_Addr".

This gray scale value GREY was stored in the target memory as a result of a "Yes" response to the preceding "Counter_Target equals Counter_Source" query.

A check is made in the next step to determine whether any gray scale value GREY at all has already been written to the target memory at the position of the reference address "Ref_Addr". If a gray scale value GREY has been written under "Ref_Addr", the state is set to "Read_Ref_Pixel"; if no gray scale value has been written the state is set to "By-pass". The state "Bypass" occurs when no gray scale value has yet been written at the position of the reference address Ref_Addr.

This is determined by comparing the instantaneous source pixel address Counter_Source with the source pixel address from the table TB. If Counter_Source is larger than the table entry, the gray scale value has already been written to the target memory under the reference address Ref_Addr and may be copied. The gray scale value is thus read in the state "Read_Ref_Pixel" and written in the state "Write_Ref_Pixel". If Counter_Source is not larger than the table entry, the state "Bypass" is set, according to which the method skips the reading of the next reference address Ref_Addr and waits until a gray scale value has been written under the reference address Ref_Addr.

Once the "Bypass" or "Read_Ref_Pixel" state has been assigned, the pointer for the instantaneous source pixel address "Counter_Source" is incremented by one unit and the method jumps to the query "New Image" (CAM_SYNC="high").

If the state "Read_Ref_Pixel" is assigned in the next state check "instantaneous state . . .", the flag "Ref_Pixel_Flag" is used to query whether the reference gray scale value GREY has already been read from the target memory at the position of the reference address "Ref_Addr" in the preceding cycle. If the reference gray scale value GREY has not already been read from the target memory, this is now done.

Following this flag query, the next target address "Tar_Addr" belonging to the instantaneous reference address "Ref_Addr" is read. The target address 1.1 from the table TB (FIG. 5b) that belongs to the reference address 1 is, for example, read under table address B+1. A next state "Write_Ref_Pixel" is then assigned, which state triggers the writing of this target address TAR_ADDR 1.1 to the target memory in the next cycle. Following the assignment, the method once again jumps to the query "New Image?" (CAM_SYNC="high") by incrementing the instantaneous source pixel address Counter_Source.

If the next state assignment indicates the state "Write_Ref_Pixel", the gray scale value GREY of the reference address read in one of the preceding cycles is written to the target memory at the position of the target address TAR_ADDR. A check is then made to determine whether the next value in the reference table TB is a reference address or a target address. This is done by evaluating the source address in the column SPB. A reference address is assigned to a source address, whereas a target address is assigned a fixed value, for example zero ("0"). This makes it possible to ascertain, by incrementing the pointer B in the table address TBB, whether a reference address or target address is present as the next value in the table TB.

If a target address appears as the next value, the state is set to "Read_Ref_Pixel" so that the next target address Tar_Addr belonging to the instantaneous reference address Ref_Addr is read in the next read cycle. If, on the other hand, the next value in the table TB is a reference address, the state is set to "Read_Ref_Addr", which results in the next reference address being read from the table TB for the subsequent multiple assignment in the next cycle. Once the appropriate state has been set, the pointer Counter_Source", which indicates the source pixel address, is incremented by one unit and the method jumps to the query "New Image?" (CAM_SYNC="high"?).

The invention is preferably applied in occupant protection systems, mobile telephones or web cameras.

A further embodiment of the invention provides for the controlled distortion (morphing) of images to create desired optical effects, for example in video cameras.

What is claimed is:

1. A method for correcting an image, comprising:
   selecting at least one predefined source pixel of a source image, the gray scale value of which predefined source pixel can be read under a predefined source pixel address;
   mapping the predefined source pixel, using a predefined imaging rule, to at least one target pixel arranged in a target image under a predefined target pixel address; and
   storing the gray scale value read under the predefined source pixel address in a memory under the predefined target pixel address, wherein
      the source pixel address of a selected source pixel and a target pixel address allocated to the source pixel address are present in at least one table,
      a source pixel address is selected using a synchronously clocked source counter and an associated gray scale value is read,
      a table address of the at least one table is selected using a target counter, as a result of which a selected source pixel address and the associated target pixel address are output,
      the source pixel address selected by the source counter is compared with the source pixel address output by the at least one table, and if the comparison finds the two addresses to be identical,
      the gray scale value of the source pixel address is stored under the target pixel address output by the at least one table, and
      the target counter is incremented.

2. A method for correcting an image, comprising:
   selecting at least one predefined source pixel of a source image, the gray scale value of which predefined source pixel can be read under a predefined source pixel address;
   mapping the predefined source pixel, using a predefined imaging rule, to at least one target pixel arranged in a target image under a predefined target pixel address; and storing the gray scale value read under the predefined source pixel address in a memory under the predefined target pixel address, wherein
      at least one selected or predefined source pixel is mapped to more than one target pixel,
      at least one of the target pixel addresses of the target pixel is determined from the source pixel address of the selected source pixel using at least one table,
      the gray scale value of the selected source pixel address is stored under one of the target pixel addresses, and
      the gray scale value of the selected source pixel address is stored under another of the target pixel addresses while at least one or more additional unselected source pixels are being read.

3. A method for correcting an image, comprising:
   selecting at least one predefined source pixel of a source image, the gray scale value of which predefined source pixel can be read under a predefined source pixel address;
   mapping the predefined source pixel, using a predefined imaging rule, to at least one target pixel arranged in a target image under a predefined target pixel address; and storing the gray scale value read under the predefined source pixel address in a memory under the predefined target pixel address, wherein
      a time interval is available in which at least one additional source pixel that is not mapped to a target pixel is read from the source image, where two or more of the time intervals to be arranged either with one immediately after the other or with each separated from the next, and
      during one or more time intervals
      the corresponding target pixel address of another target pixel or pixels is determined using the at least one table or an additional table, and
      the gray scale value stored under a target pixel address is read and stored by the another of the target pixel addresses.

4. A method for correcting an image, comprising:
   selecting at least one predefined source pixel of a source image, the gray scale value of which predefined source pixel can be read under a predefined source pixel address;
   mapping the predefined source pixel, using a predefined imaging rule, to at least one target pixel arranged in a target image under a predefined target pixel address; and storing the gray scale value read under the predefined source pixel address in a memory under the predefined target pixel address, wherein
      the source image has source pixels arranged in a matrix,
      the address space of the at least one table is essentially the same size as the address space of the target image,
      the number of target pixels is smaller than the number of source pixels, and
      at least one table has table addresses, each of which indicates a source pixel address and a target pixel address.

* * * * *

UNITED STATES PATENT AND TRADEMARK OFFICE
CERTIFICATE OF CORRECTION

| | |
|---|---|
| PATENT NO. | : 7,304,680 B2 |
| APPLICATION NO. | : 10/469782 |
| DATED | : December 4, 2007 |
| INVENTOR(S) | : Thorsten Köhler and Ulrich Wagner |

Page 1 of 1

It is certified that error appears in the above-identified patent and that said Letters Patent is hereby corrected as shown below:

On the Title Page, Item (22) should read:

(22) PCT Filed: Mar. 5, 2001

Signed and Sealed this

Thirteenth Day of May, 2008

JON W. DUDAS
*Director of the United States Patent and Trademark Office*